United States Patent
Chen et al.

(10) Patent No.: US 7,129,989 B2
(45) Date of Patent: Oct. 31, 2006

(54) FOUR-FIELD MOTION ADAPTIVE DE-INTERLACING

(75) Inventors: Liang-Gee Chen, Taipei (TW);
Shyh-Feng Lin, Taipei (TW); Patrick Chou, Tainan (TW); Yu-Lin Chang, Taipei (TW); Ryan Chen, Tainan (TW)

(73) Assignee: AVerMedia Technologies, Inc., Taipei (TW)

( * ) Notice: Subject to any disclaimer, the term of this patent is extended or adjusted under 35 U.S.C. 154(b) by 569 days.

(21) Appl. No.: 10/637,594

(22) Filed: Aug. 11, 2003

(65) Prior Publication Data
US 2005/0036063 A1    Feb. 17, 2005

(51) Int. Cl.
H04N 7/01    (2006.01)
H04N 11/20   (2006.01)
(52) U.S. Cl. .................. 348/448; 348/452; 348/441
(58) Field of Classification Search ............. 348/448, 348/441, 451–452, 459, 97, 558, 526, 911; H04N 7/01, H04N 11/20
See application file for complete search history.

(56) References Cited

U.S. PATENT DOCUMENTS

| | | | | |
|---|---|---|---|---|
| 5,596,371 A * | 1/1997 | Pakhchyan et al. | ......... | 348/452 |
| 6,118,489 A * | 9/2000 | Han et al. | ............ | 348/452 |
| 6,421,090 B1 * | 7/2002 | Jiang et al. | ............ | 348/452 |
| 6,614,484 B1 * | 9/2003 | Lim et al. | ............ | 348/448 |
| 6,859,237 B1 * | 2/2005 | Swartz | ............ | 348/700 |
| 6,891,571 B1 * | 5/2005 | Shin et al. | ............ | 348/448 |
| 6,985,187 B1 * | 1/2006 | Han et al. | ............ | 348/452 |

* cited by examiner

Primary Examiner—David Ometz
Assistant Examiner—Trang U. Tran
(74) Attorney, Agent, or Firm—Birch, Stewart, Kolasch & Birch, LLP (57) ABSTRACT

This invention presented a universal de-interlacing method and system by the motion detection, the motion adaptive interpolation, the directional edge interpolation, the 3:2 pull-downed detection and the 3:2 Pull-Downed recovery. Four-field motion detection can detect the motion area and the still area. By cooperating with the motion adaptive interpolation and the directional edge interpolation the picture possesses the very clear quality, high contrast, and high resolution. The 3:2 pull-downed detection and the 3:2 Pull-Downed recovery can detect the 3:2 Pull-Downed movie sequence and recover the interlaced fields into a progressive frames universally without too much overhead of computational power.

12 Claims, 6 Drawing Sheets

FOUR-FIELD MOTION ADAPTIVE DE-INTERLACING

BACKGROUND OF THE PRESENT INVENTION

1. Field of the Invention

The invention relates to a method and system for de-interlacing, and more particularly, to a method and system for four fields de-interlacing with motion detection, motion compensation, directional edge interpolation, 3:2 pull-downed detection, and 3:2 pull-downed recovery.

2. Description of the Prior Art

Modern computer systems are not constrained by data transfer rate required for the non-interlaced format to the same extent as were early television systems. However, the use of interlaced display formats for many consumer video products is common and unlikely to disappear soon. In order to display this interlaced material on a non-interlaced computer display there is a need for de-interlacing.

De-interlacing has become an important technique for scanning rate conversion in nowadays. Interlaced sequences are usually transmitted to the audiences by 60 fields per second. In order to display these interlaced sequences on the progressive devices (e.g. Computers, HDTV), the progressive devices ought to reconstruct the missing field. If de-interlacing is not done perfectly, audiences will suffer uncomfortable visual artifacts. These kinds of defects such as edge flicker, line crawling will cause critical distortion m the output frames.

Progressive devices commonly use a non-interlaced video display format, also called a progressive scan. That is, an entire frame is scanned line-by-line, typically from top to bottom. The process repeats and re-scans the entire frame at a given refresh rate, for example, 75 Hz. In contrast, many sources of consumer video, such as television signals, use an interlaced display format. Interlaced systems interleave two or more fields to display an entire frame. A typical U.S. NTSC television signal uses two fields, each with video data for every other horizontal line of the entire frame, and consecutively scans the two fields 30 times per second. The audience perceives the resulting image as a blend of the two individual fields with an effective refresh rate of 60 Hz. If instead, the entire frame was scanned progressively at 30 Hz, the audience might perceive a flicker of the displayed image. The flicker is much less apparent with higher refresh rates such as 60 Hz. The interlaced format thus reduces flicker without requiring a doubling of the data transfer rate needed to update the entire frame at 60 Hz. It calls the 3:2 pull-down. While 3:2 pull-down method transforms sequences from 24 frames per second into 60 fields per second, it generates fields patterns like "EOE OE" or "OEO EO" (E means even field, O means odd field) where fields together like "EOE" or "OE" means they came from the same frame. Other interlaced video formats are also common, such as the 50 Hz phase alternation line (PAL) system used in Europe.

The timing of the two or three fields generated from a frame is the same and the fields generated by way of this are called the fields in progressive video. On the contrary, if the timing of each field is different, then the fields are called the fields in interlaced video. The images of a motion are on the same location if the fields are at the same timing in the fields in progress video, but they are on the different locations in the fields in interlaced video.

A frame is combined by an odd line field and an even line field. In other words, interleaving the odd and even lines combines the frame. Thus, the method for de-interlacing a field to reconstruct a frame is to interleave the odd and even lines of the field and a complement field. The de-interlacing methods are classified as three categories: intra-field interpolation, inter-field interpolation, motion adaptive interpolation.

As mentioned above, inter-field interpolation is a simple de-interlacing method that it just combines two interlaced fields into one progressive frame. Inter-field interpolation may suffer severe visual quality degradation if there are lots of fast motion images in those field sequences. So inter-field interpolation is not considered to be a good method for de-interlacing a 60fps fast-motion field source. Another popular linear technique is intra-field interpolation, which constructs a new field by the intra-field interpolation to combine with the current field. The audiences may not feel uncomfortable while watching sequences de-interlaced by the intra-field interpolation. But there is a disadvantage while adopting intra-field interpolation, the vertical resolution is halved due to the interpolated new field: the output frame will be blurred after the combination of the current field and the interpolated new field. Motion Estimation can obtain good image quality, but it also costs a lot of time. Thus a motion adaptive interpolation with all kinds of advantages and precise motion detection is preferred.

SUMMARY OF THE PRESENT INVENTION

One main purpose of the present invention is to resolve the problem of edge flicker.

Another main purpose of the present invention is to reconstruct the original frames by the 3:2 pull-downed recovery.

Still another main purpose of the present invention is to de-interlace the interlaced fields to reconstruct the progress frames with good efficiency and quality when 3:2 pull-downed can not be detected.

Accordingly, the present invention provides an adaptive motion de-interlacing method and system with four fields motion detection, motion compensation, directional edge interpolation, 3:2 pull-downed detection and 3:2 pull-downed recovery. The four fields motion detection can either identify the motion area and the still area, or have the clear quality, high brightness and high resolution of the pictures harmonized by the motion compensation and directional edge interpolation. In addition, 3:2 pull-downed detection and 3:2 pull-downed recovery can reconstruct the original progressive frames by using a few computing cost.

The features and advantages of the present invention are described as following and integrated into the claims.

DETAILED DESCRIPTION OF THE PREFERRED EMBODIMENT

Figure 1A:
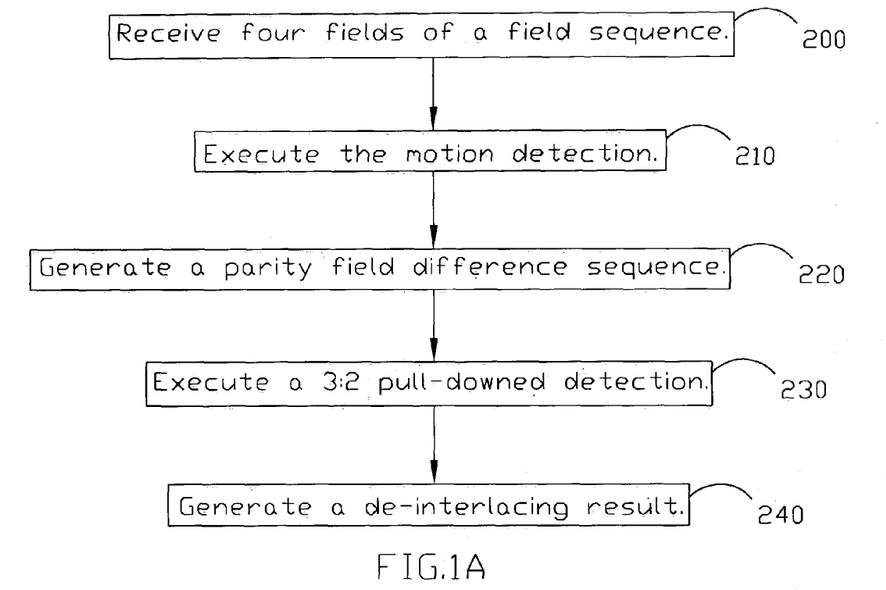
FIG. 1A to FIG. 1D illustrates the diagrams of the first preferred embodiment of the present invention.

The present invention firstly presents a four-field adaptive de-interlacing method. FIG. 1A illustrates a diagram of the first embodiment of the present invention. Referring to step 200, which receives four fields of a field sequence, wherein the four fields in the order before and after are a first field, a second field, a third field and a fourth field. Each field of the field sequence is formed by the same pixel positions, and so are its parity fields (the forward parity field and the backward parity field) under difference time. The pixel positions formal plurality of scan lines. That is, each field has some scan lines that each of the scan lines is formed by some pixels. Each signal pixel is located on a signal pixel position. Many pixels that each of them is within a different field may be on the same pixel position at different time. Then step 210 executes the motion detection for generating a motion detection result. Later, a parity field difference sequence is generated depending on the motion detection result in step 220. Afterwards, step 230 executes a 3:2 pull-downed detection for generating a 3:2 pull-downed result depending on the parity field difference sequence. Finally, Step 240 generates a de-interlacing result by a de-interlacing method depending on the 3:2 pull-downed result.

The above-mentioned parity field difference sequence, comprising: generating a parity field difference of the third field by the motion detection and recording the parity field difference sequence. Referring to the step 221 of FIG. 1D, which firstly generates a parity field difference of the third field by the motion detection. The parity field difference is the sum of the differences of each pair correlative pixels that each of the two pixels respectively belongs to the first field and the third field. The parity field difference can also be presented as similar or not (i.e. use of true or false to present as similar or not similar respectively). Then, referring to step 222, the parity field difference sequence is recorded. The parity field difference sequence is a plurality of the forward parity field differences of the parity field difference before the third field and the parity field difference of the third field.

Furthermore, the above-mentioned 3:2 pull-downed detection searches for a plurality of initial parity field differences in the parity field difference sequence. The initial parity field differences are smaller than a second threshold and separated from by an interval of five parity field differences. In addition, the 3:2 pull-downed result is 3:2 pull-downed detected when the amount of the initial parity field differences is over a third threshold, otherwise, the 3:2 pull-downed result is 3:2 pull-downed undetected. The de-interlacing result is generated by different de-interlacing methods depending on different 3:2 pull-downed result. For example, the de-interlacing result is generated by a 3:2 pull-downed recovery when the 3:2 pull-downed result is 3:2 pull-downed detected. Otherwise, the de-interlacing result is a frame line by line interleaved by the third field and an interpolation field when the 3:2 pull-downed result is 3:2 pull-downed undetected. On these ground, an intra-field interpolation and an inter-field interpolation are used to generate interpolation pixels corresponding to the motion area and the still area separately on the scan lines of the interpolation field. In the reconstructed frame interleaved by the interpolation filed and the third field, each scan line of the interpolation field is between the scan lines of the third field. Besides, the above-mentioned intra-field interpolation and inter-field interpolation can be edge-directional interpolation and motion compensation separately.

Foregoing parity field difference can be the amount of different pixels between the first field and its forward parity field. When the parity field different is below a threshold, the first field and its forward parity field can be considered as the same. Moreover, the parity field difference can be assigned as true or false to identify whether or not they are extremely similar.

Accordingly, when 3:2 pull-downed detection result is 3:2 pull-downed undetected, the foregoing de-interlacing method comprises intra-field interpolation, inter-field interpolation and adaptive motion de-interlacing. When the 3:2 pull-downed result is 3:2 pull-downed detected, the de-interlacing result is generated by a 3:2 pull-downed recovery. For example, a first frame, a second frame and a third frame separately corresponding to the first field, the third field and the second field are generated by de-interlacing the first field and the third field or by de-interlacing the first field and the second field. Then a fourth frame and a fifth frame separately corresponding to the fourth field and a fifth field are generated by de-interlacing the fourth field and the fifth field. The fifth field is the next field after the fourth field in the field sequence.

Figure 2:
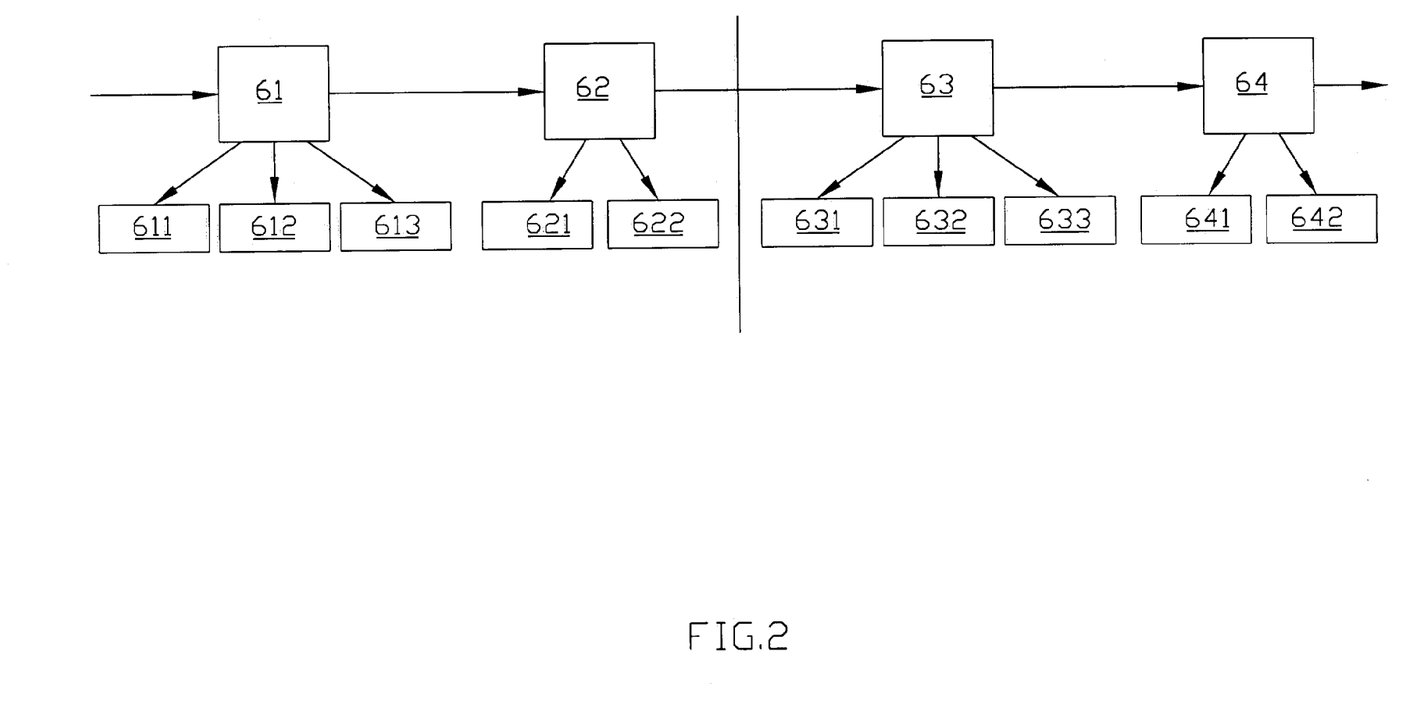
FIG. 2 illustrates the diagrams of the 3:2 pull-down recovery.

Referring to FIG. 2, frames 61, 62, 63, 64 are in a frame sequence. Within the frame sequence, fields 611, 612 and 613 from frame 61, fields 621 and 622 from frame 62, fields 631, 632 and 633 from frame 63 and fields 641 and 642 from frame 61 are generated by 3:2 pull-down. In the case, the parity field differences between field 611 and 613 and the parity field differences between field 631 and 633 must be zero, because each pair of them is generated from the same field. That is, the parity field differences must appear zero per 5 times if the fields are produced by 3:2 pull-down. In other words, each field can be recovered to be the original frame when a zero parity field difference is detected per successive five parity field differences. Meanwhile, the two fields with zero parity field difference and the field between the two fields are introduced from the same frame, and the following two fields are from the successive frame. So field 611, field 612 and field 613 can be reconstruct three same frames by combining field 612 and 613, and field 621 and field 622 can be reconstruct two same frames by combining field 621 and field 622. The rest may be deduced by analogy. Then the original frames can be recovered by a different frequency.

Figure 1B:
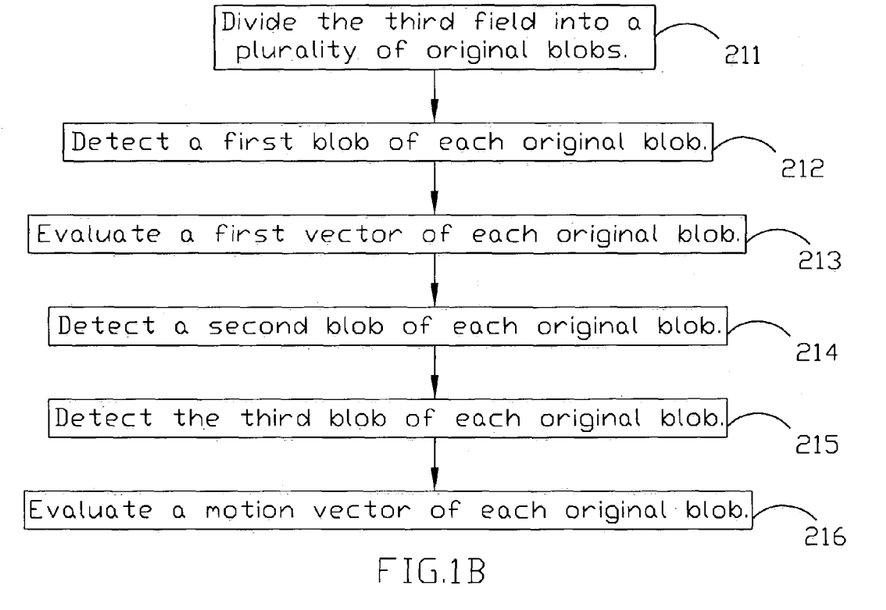

FIG. 1B illustrates a diagram of the above-mentioned motion detection. Firstly referring to step 211, which divides the third field into a plurality of original blobs, wherein each of the original blobs comprises a plurality of pixels. Each pixel is individually on one of the pixel positions. Next referring to step 212, which detects a first blob of each original blob, wherein the first blob exists if there is at least one blob with a first difference smaller than a first threshold. The first blob is the blob with the corresponding position most close to the original blob. If there is no blob with a first difference smaller than a first threshold, the first blob does not exist. The first difference is the difference of the blob itself and the original blob. After that, step 213 evaluates a first vector of each original blob. The first vector is from the corresponding position of the first blob to the corresponding position of the original blob when the first blob exists; otherwise, the first vector does not exist. Afterwards referring to step 214, a second blob of each original blob is detected, wherein the second blob locates in the center between the corresponding positions of the first blob and the original blob. The second blob exists when a third blob of the original blob exists; otherwise, the second blob does not exist. Furthermore the third blob of each original blob is detected by step 215, wherein the third blob is at a distance of the first vector from the second blob. The third blob exists when a second difference of the second, blob and the third blob is smaller than a threshold, otherwise, the third blob does not exist. Finally referring to step 216, which evaluates a motion vector of each original blob, wherein the motion vector is from the corresponding position of the second blob to the corresponding position of the original blob when the second blob exists, otherwise, the motion vector does not exist. Besides, the motion vector of the first blob is also the motion vector of all pixel positions corresponding to the original blob.

The first difference is the sum of the differences of each pair correlative pixels that each of the two pixels respectively belongs to one of the original blob and the first blob. Moreover, the second difference is the sum of the differences of each pair correlative pixels that each of the two pixels respectively belongs to one of the second blob and the third blob. In addition, the foregoing difference is the difference of luminance or chroma.

What is more, the intra-field interpolation generates each interpolation pixel on the motion area by motion compensation according to a first pixel in the second field. The interpolation pixel is at a distance of the above-mentioned motion vector from the pixel position on where the first pixel is.

Figure 1C:
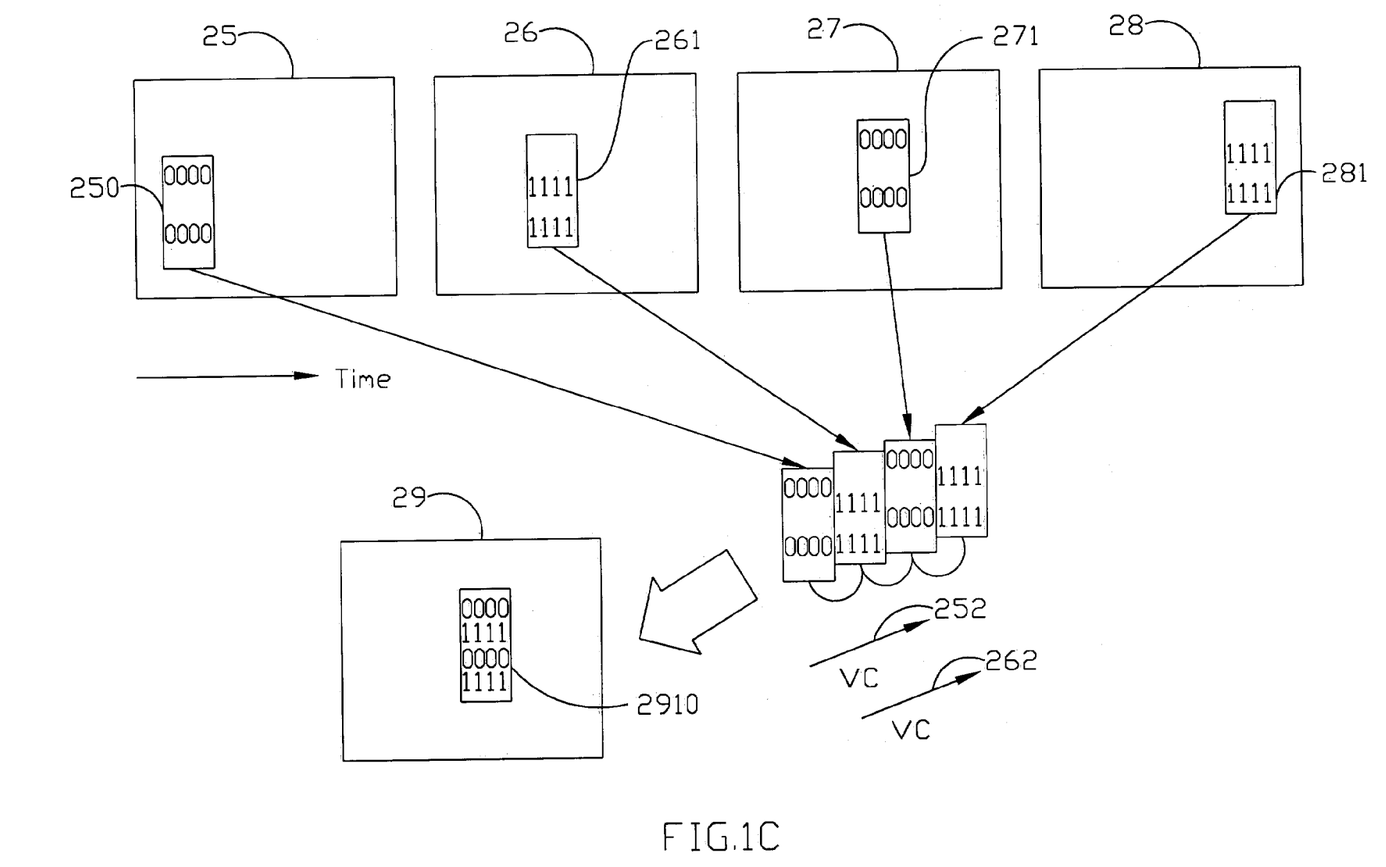
Figure 1D:
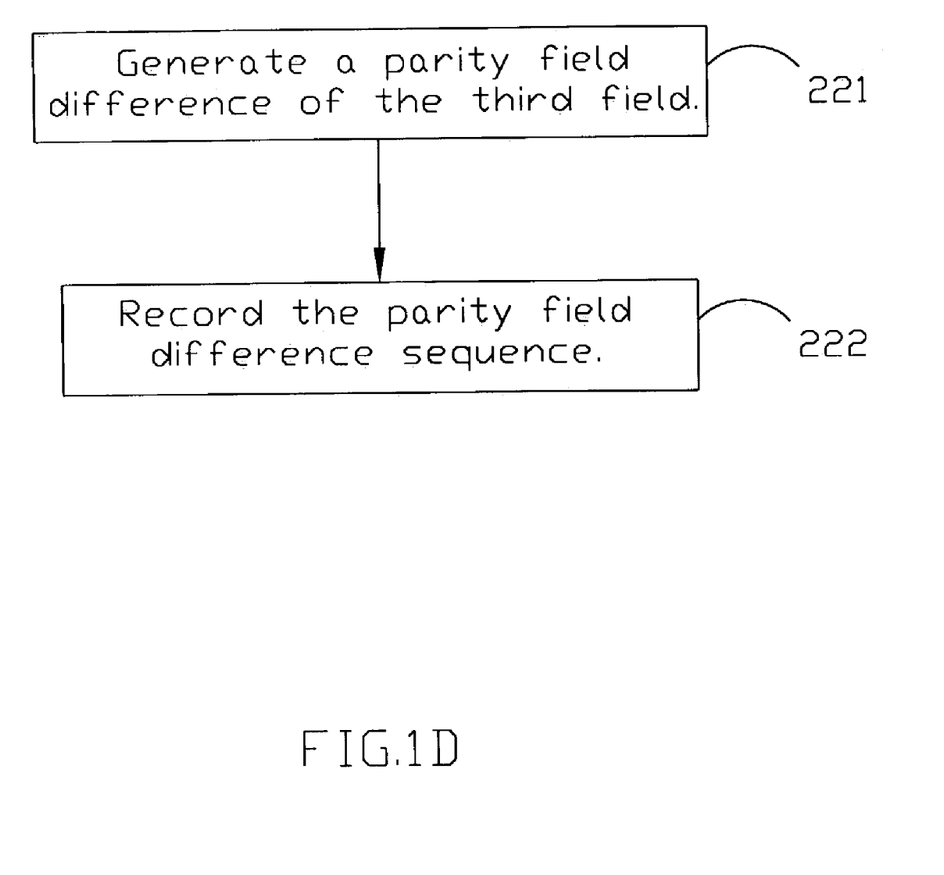

Referring to FIG. 1C, the first field 25, the second field 26, the third field 27, and the fourth field 28 are the successive four fields in a field sequence. In order to detect a second blob 261 in the second field 26, firstly search a first blob 250 in the first field 25, wherein the first blob 250 is extremely similar to the original blob 270. If the first blob 250 is found, the first vector from the first blob 250 to the original blob 270 can be evaluated. Then the second blob 261 and the third blob 281 is compared, wherein the second blob 261 is at the center of the corresponding positions of the first blob 250 and the original blob 270 in the second field 26. In the meantime, the third blob 281 is on the position with the first vector from the second blob 261 in the fourth field 28. If the second blob 261 is extremely similar to the third blob 281, then the motion vector is from the second blob 261 to the original blob 270. When the original blob 270 is de-interlaced by an intra-field interpolation, the above-mentioned motion compensation is used to generate a frame blob 2910 of a frame 29 depending on the second blob 261 and the original blob 270.

Moreover, all of the original blobs whose motion vectors do not exist can be considered as the motion area, otherwise, the rest area can be considered as the still area. The motion vector of each pixel position inside the still area is the motion vector corresponding to its original vector.

Furthermore, the above-mentioned directional edge interpolation comprising the following steps. Firstly, the interpolation pixels on the motion area of each scan line of the interpolation field are generated. Each scan line is between a first scan line and a second scan line of the third field corresponding to the frame. Then, generate each interpolation pixel according to an average value of a most similar pixel pair of a plurality of pixel pairs. The most similar pixel is one of the pixel pairs with a smallest difference. Finally, get the pixel pairs corresponding to each the interpolation pixel. Each pixel of the pixel pair individually belongs to one of the first scan line and the second scan line, and each pixel pair is on an individual straight line radiating from the interpolation pixel. The pixel pairs can be the five pixel pairs that they are most close to the directional edge interpolation pixel, and they are up-down, left-up to right-down, right-up to left-down, left-left-up to right-right-down and right-right-up to left-left-down.

Figure 3:
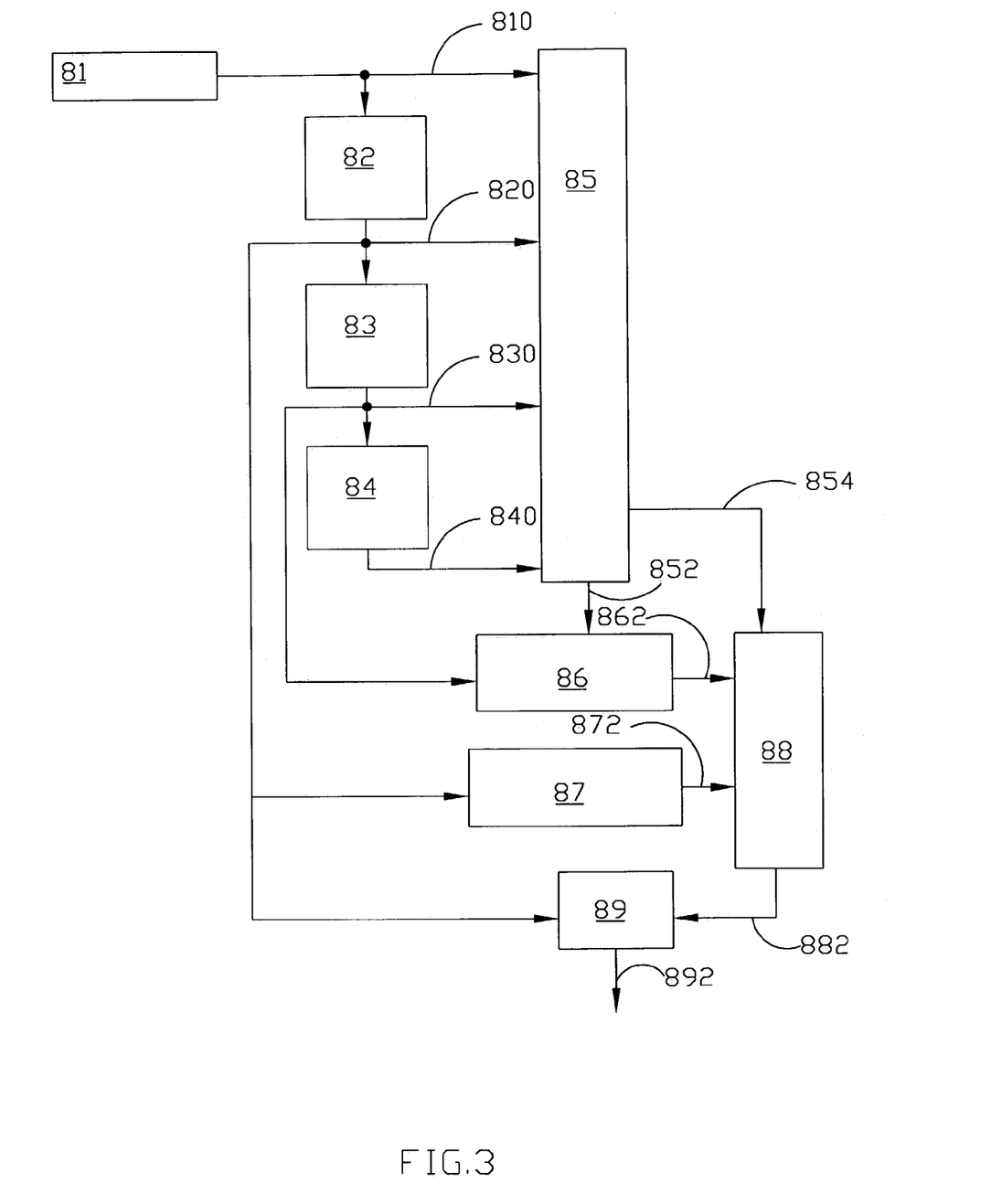
FIG. 3 illustrates a function block diagram of the sixth embodiment of the present invention.

In view of the above, the present invention provides a four-field motion adaptive de-interlacing system. Referring to FIG. 3 is a diagram of the sixth preferred embodiment of the present invention, comprising: a first storage means 84, a second storage means 83, a third storage means 82, a field stream 81, a motion detection means 85, compensation means 86, a directional edge interpolation means 87, a pixel switch means 88, and field switch means 89. The first storage means 84 is used for storing and outputting a first field 840, wherein the first field 840 is inputted from the second storage means 83 and outputted after a period. The second storage means 83 is used for storing and outputting a second field 830, wherein the second field 830 is inputted from a third storage means 82 and outputted after the period. The third storage means is used for storing and outputting a third field 820, wherein the third field 820 is inputted from a field stream 81 and outputted after the period. Moreover, the field stream 81 is used for inputting a fourth field 810 of a field sequence. The first field 840, the second field 830, the third field 820, and the fourth field 810 are four fields in the order from before to after of the field sequence. Each field of the field sequence comprises the same plurality of pixel positions as the parity fields of the field under difference time. Depending on the four fields, the motion detection means 85 can generate a motion vector sequence 852, a pixel decision sequence 854, an, initial signal of the third field, and a output decision. Then, the motion compensation means 86 generates a first pixel sequence 862 formed by a plurality of first pixels, each the first pixel is respectively on one of the pixel positions. Furthermore, the directional edge interpolation means 87 is used for generating a second pixel sequence 872 formed by a plurality of second pixels, each the second pixel is respectively on one of the pixel positions. Next, the pixel switch means 88 generate an interpolation field sequence 882 by switching between the first pixel sequence 862 and the second pixel sequence 872 according to the pixel decision sequence 854, wherein the interpolation field sequence 882 comprises a plurality of interpolation fields. In addition, the field switch means 89 generates a frame sequence 892 comprises a plurality of frames generated by interleaving the third field 820 and the interpolation field line by line.

The foregoing interpolation sequence comprises a plurality of interpolation fields, wherein each interpolation field comprises a plurality of interpolation scan lines. Each interpolation scan line comprises the same plurality of pixel position with an interpolation pixel as the second field. Depending on the foregoing motion detection the motion vector of each pixel position in the third field can be generated. The motion vector sequence comprises the motion vectors that each of them is respectively corresponding to each the pixel position. For example, the pixel switch means selects the first pixel to be the interpolation pixel according to the pixel decision when the motion vector of the pixel position exists, otherwise, the second pixel is selected to be the interpolation pixel. The first pixel, the second pixel, and the interpolation pixel are corresponding to the same pixel position.

Figure 4:
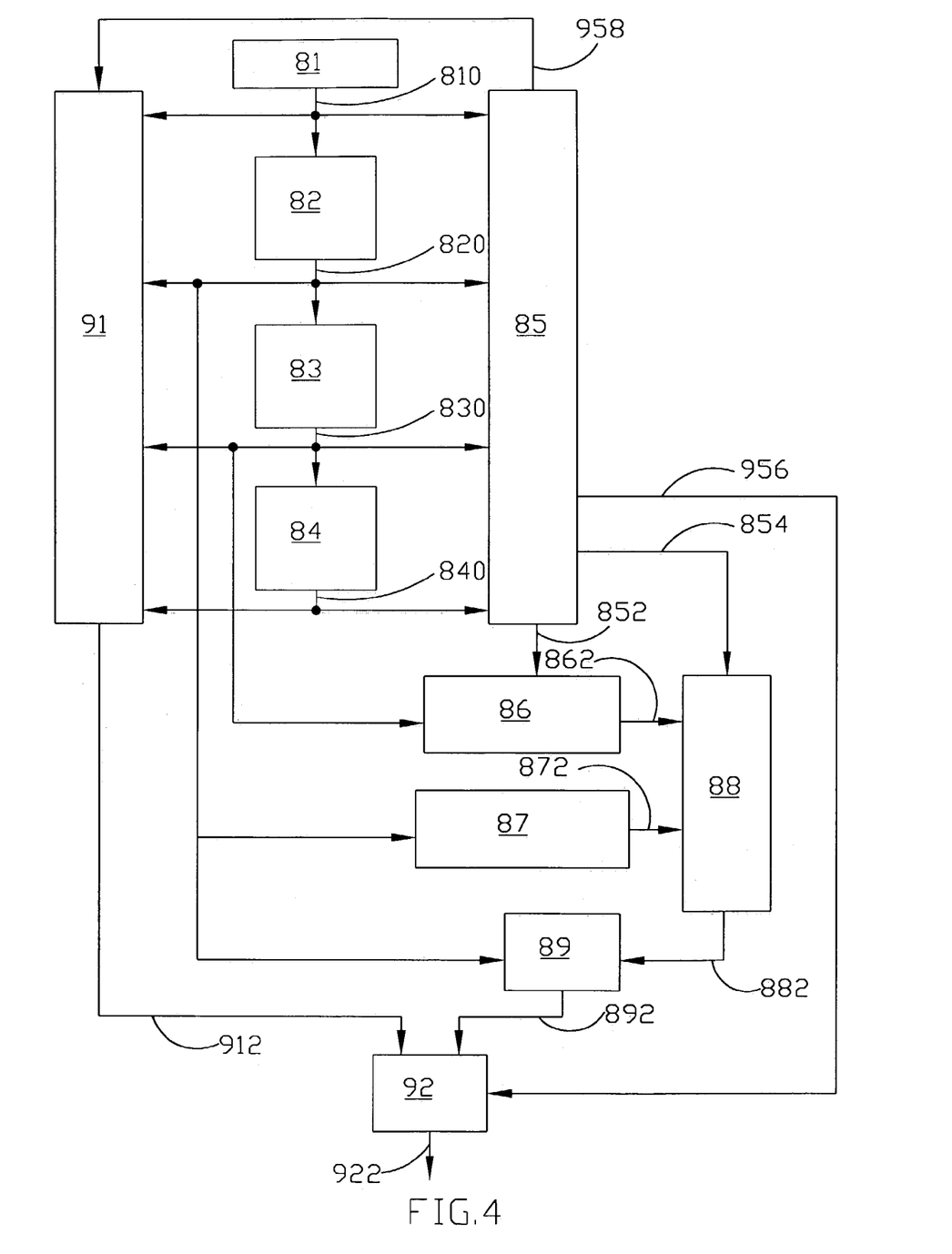
FIG. 4 illustrates a function block diagram of the seventh embodiment of the present invention.

FIG. 4 is a diagram of the seventh preferred embodiment of the present invention, the preferred embodiment is the extension of the sixth preferred embodiment, further comprising a 3:2 pull-downed recovery means 91 and an output switch means 92. Moreover, the foregoing motion detection means further generates a parity field difference sequence and performs a 3:2 pull-downed detection every the period to introduce initial signal 958 of the third field and a output decision sequence 956. Besides, the 3:2 pull-downed recovery means is used for generating a 3:2 pull-downed frame sequence depending on the four fields whenever the initial signal 958 of the third field is received. Finally, the output switch means chooses one of the frame sequence and the 3:2 pull-downed frame sequence for outputting according to the output decision.

Furthermore, the motion detection means generates the initial signal of the third field when the parity field difference of the third field is an initial parity field difference. Then the 3:2 pull-downed recovery means can identify the position of the third field in the field sequence and generate the 3:2 pull-downed sequence when the initial signal of the third field is received. The output switch means select the 3:2 pull-downed frames sequence for outputting according to the output decision whenever the amount of the initial parity field difference is more than a third threshold every period, otherwise, the frame sequence is selected for outputting.

What are described above are only preferred embodiments of the invention, not for confining the claims of the invention; and for those who are familiar with the present technical field, the description above can be understood and put into practice, therefore any equal-effect variations or modifications made within the spirit disclosed by the invention should be included in the appended claims.

What is claimed is:

1. A four-field motion adaptive de-interlacing method, comprising:
   receiving four fields of a field sequence, wherein said four fields in the order before and after are a first field, a second field, a third field and a fourth field, and each field of said field sequence is formed by the same plurality of pixel positions as the parity fields of said field under difference time and said pixel positions forms a plurality of scan lines;
   executing a motion detection for generating a motion detection result;
   generating a parity field difference sequence depending on said motion detection result;
   executing a 3:2 pull-downed detection for generating a 3:2 pull-downed result depending on said parity field difference sequence; and
   generating a de-interlacing result by a de-interlacing method depending on said 3:2 pull-downed result, wherein said motion detection comprising:
   dividing said third field into a plurality of original blobs, wherein each of said original blobs comprises a plurality of pixels, each said pixel is individually on one of said pixel positions;
   detecting a first blob of each said original blob, wherein each said first blob exists if there is at least one blob with a first difference smaller than a first threshold and said first blob is the blob with the corresponding position most close to said original blob, otherwise, said first blob does not exist, wherein said first difference is the difference of said blob itself and said original blob;
   evaluating a first vector of each said original blob, wherein said first vector is from the corresponding position of said first blob to the corresponding position of said original blob when said first blob exists, otherwise, said first vector does not exist;
   detecting a second blob of each said original blob, wherein said second blob locates in the center between the corresponding positions of said first blob and said original blob, wherein said second blob exists when a third blob of said original blob exists, otherwise, said second blob does not exist;
   detecting said third blob of each said original blob, wherein said third blob is at a distance of said first vector from said second blob, wherein said third blob exists when a second difference of said second blob and said third blob is smaller than said first threshold, otherwise, said third blob does not exist; and
   evaluating a motion vector of each said original blob, wherein said motion vector is from the corresponding position of said second blob to the corresponding position of said original blob when said second blob exists, otherwise, said motion vector does not exist.

2. The method according to claim 1, wherein said first difference is the sum of the differences of each pair correlative pixels that each of the two pixels respectively belongs to one of said original blob and said first blob, and said second difference is the sum of the differences of each pair correlative pixels that each of the two pixels respectively belongs to one of said second blob and said third blob.

3. The method according to claim 2, wherein said difference is the difference of luminance.

4. The method according to claim 1, wherein the method for generating said parity field difference sequence, comprising:
   generating a parity field difference of said third field by said motion detection, wherein said parity field difference is the sum of the differences of each pair correlative pixels that each of the two pixels respectively belong to said first field and said third field; and
   recording said parity field difference sequence, wherein said parity field difference sequence is a plurality of said forward parity field differences of said parity field difference before said third field and said parity field difference of said third field.

5. The method according to claim 1, wherein said 3:2 pull-downed detection searches for a plurality of initial parity field differences in said parity field difference sequence, wherein said initial parity field differences are smaller than a second threshold and separated from by an interval of five parity field differences, wherein said 3:2 pull-downed result is 3:2 pull-downed detected when the amount of said initial parity field differences is over a third threshold, otherwise, said 3:2 pull-downed result is 3:2 pull-downed undetected.

6. The method according to claim 5, wherein said motion detection result is a motion area with said pixel positions corresponding to the union of all said original blobs whose motion vector does not exist, and a still area is the area with said pixel positions except said motion area.

7. The method according to claim 6, wherein said de-interlacing result is a frame line by line interleaved by said third field and an interpolation field when said 3:2 pull-downed result is 3:2 pull-downed undetected, wherein an intra-field interpolation and an inter-field interpolation are used to generate each interpolation pixel corresponding to said motion area and said still area separately on said scan lines of said interpolation field between said scan lines of said third field in said frame.

8. The method according to claim 7, wherein said intra-field interpolation generates each said interpolation pixel on said motion area by a motion compensation according to a first pixel in said second field, wherein said interpolation pixel is at a distance of said motion vector from said pixel position on where said first pixel is.

9. The method according to claim 7, wherein said inter-field interpolation is a directional edge interpolation, comprising:
   generating said interpolation pixels on said motion area of each said scan line of said interpolation field between a first scan line and a second scan line of said third field corresponding to said frame;
   generating each said interpolation pixel according to an average value of a most similar pixel pair in a plurality of pixel pairs, wherein said most similar pixel is one of said pixel pairs with a smallest difference; and getting said pixel pairs corresponding to each said interpolation pixel, wherein each pixel of said pixel pair individually belongs to one of said first scan line and said second scan line, and each pixel pair is on an individual straight line radiating from said interpolation pixel.

10. The method according to claim 9, wherein said pixel pairs are the five pixel pairs that they are most close to the directional edge interpolation pixel, and they are up-down, left-up to right-down, right-up to left-down, left-left-up to right-right-down and right-right-up to left-left-down.

11. The method according to claim 5, wherein said de-interlacing result is generated by a 3:2 pull-downed recovery when said 3:2 pull-downed result is 3:2 pull-downed detected, said 3:2 pull-downed recovery comprising:

generating a first frame, a second frame and a third frame separately corresponding to said first field, said second field and said third field by interleaving said first field and said second field; and generating a fourth frame and a fifth frame separately corresponding to said fourth field and a fifth field by de-interlacing said fourth field and said fifth field, wherein said fifth field is the field next to said fourth field in said field sequence.

12. The method according to claim 5, wherein said de-interlacing result is generated by a 3:2 pull-downed recovery when said 3:2 pull-downed result is 3:2 pull-downed detected, said 3:2 pull-downed recovery comprising:

generating a first frame, a second frame and a third frame separately corresponding to said first field, said second field and said third field by interleaving said third field and said second field; and generating a fourth frame and a fifth frame separately corresponding to said fourth field and a fifth field by de-interlacing said fourth field and said fifth field, wherein said fifth field is the field next to said fourth field in said field sequence.

* * * * *